United States Patent
Rabb

(10) Patent No.: US 11,881,775 B2
(45) Date of Patent: Jan. 23, 2024

(54) SYSTEMS AND METHODS TO REMOVE INPUT VOLTAGE DEPENDENCY IN A POWER CONVERTER

(71) Applicant: Microchip Technology Inc., Chandler, AZ (US)

(72) Inventor: Jason Rabb, Austin, TX (US)

(73) Assignee: Microchip Technology inc., Chandler, AZ (US)

(*) Notice: Subject to any disclaimer, the term of this patent is extended or adjusted under 35 U.S.C. 154(b) by 407 days.

(21) Appl. No.: 17/244,882

(22) Filed: Apr. 29, 2021

(65) Prior Publication Data

US 2021/0359604 A1 Nov. 18, 2021

Related U.S. Application Data

(60) Provisional application No. 63/025,120, filed on May 14, 2020.

(51) Int. Cl.
*H02M 3/158* (2006.01)
*H04Q 1/28* (2006.01)

(52) U.S. Cl.
CPC .............. *H02M 3/158* (2013.01); *H04Q 1/28* (2013.01)

(58) Field of Classification Search
CPC ...... H02M 3/158; H02M 3/071; H02M 3/156; H02M 1/0095; H02M 1/009; H04Q 1/28
See application file for complete search history.

(56) References Cited

U.S. PATENT DOCUMENTS

| 9,621,037 B2 | 4/2017 | Rossi et al. |
| 10,056,844 B2 | 8/2018 | Quaglino et al. |
| 2014/0368035 A1* | 12/2014 | Lofthouse ............. H02M 3/155 307/31 |
| 2015/0098562 A1* | 4/2015 | Rossi .................... H02M 3/156 379/413 |
| 2016/0231759 A1* | 8/2016 | Lofthouse ................ G05F 1/56 |

FOREIGN PATENT DOCUMENTS

| CA | 2661723 A1 * | 2/2008 | ............... G05F 1/10 |
| EP | 1199788 A1 * | 4/2002 | ............. H02M 3/07 |
| EP | 1199788 A1 | 4/2002 | |

OTHER PUBLICATIONS

PCT/US2021/030517, International Search Report and Written Opinion, European Patent Office, dated Jul. 28, 2021.

* cited by examiner

*Primary Examiner* — Akelaw Teshale
(74) *Attorney, Agent, or Firm* — Glass & Associates; Kenneth Glass; Molly Sauter

(57) ABSTRACT

A system and method for generating a low supply voltage and a high supply voltage from an input voltage, wherein the dependency of the high supply voltage magnitude on the magnitude of the input voltage is removed and the resulting high supply voltage magnitude is a multiple of the low supply voltage magnitude. The low supply voltage and the high voltage may be implemented in a power converter of a communication system comprising a plurality of subscriber line interface circuits (SLICs).

20 Claims, 7 Drawing Sheets

500

ACTIVATING AND DEACTIVATING A SWITCHING ELEMENT OF THE SWITCHING CIRCUIT BASED UPON THE MODULATED CONTROL SIGNAL TO ESTABLISH A DUTY CYCLE IN THE SWITCHING CIRCUIT, THE DUTY CYCLE COMPRISING A CHARGING CYCLE AND A DISCHARGING CYCLE
505

CHARGING AN ENERGY STORAGE ELEMENT OF THE SWITCHING CIRCUIT DURING A CHARGING CYCLE OF THE SWITCHING CIRCUIT
510

DISCHARGING THE ENERGY STORAGE ELEMENT THROUGH A FIRST DIODE AND TO A FIRST CAPACITOR OF THE SWITCHING CIRCUIT DURING THE DISCHARGING CYCLE, TO GENERATE THE LOW SUPPLY VOLTAGE AT THE FIRST OUTPUT NODE OF THE POWER CONVERTER
515

CHARGING A SECOND CAPACITOR OF THE INPUT VOLTAGE CANCELLATION CIRCUIT TO ESTABLISH A BIAS ON THE SECOND CAPACITOR HAVING A MAGNITUDE EQUAL TO THE INPUT VOLTAGE
520

PREVENTING THE SWITCHING NODE FROM DROPPING TO THE LOW SUPPLY VOLTAGE BY MAINTAINING AN OFFSET ACROSS THE SECOND CAPACITOR EQUAL TO A MAGNITUDE OF THE INPUT VOLTAGE
525

ESTABLISHING A VOLTAGE ACROSS A PUMP CAPACITOR OF EACH OF A PLURALITY OF BOOST STAGES OF THE BOOST CIRCUIT DURING THE CHARGING CYCLE, WHEREIN THE VOLTAGE ACROSS THE PUMP CAPACITOR IS SUBSTANTIALLY EQUAL TO THE LOW SUPPLY VOLTAGE PLUS THE MAGNITUDE OF THE INPUT VOLTAGE
530

GENERATING A HIGH SUPPLY VOLTAGE THAT IS A MULTIPLE OF THE LOW SUPPLY VOLTAGE AND IS INDEPENDENT OF THE MAGNITUDE OF THE INPUT VOLTAGE
535

FIG. 6

SYSTEMS AND METHODS TO REMOVE INPUT VOLTAGE DEPENDENCY IN A POWER CONVERTER

CROSS-REFERENCE TO RELATED APPLICATIONS

The present application claims priority to U.S. Provisional Patent Application Ser. No. 63/025,120, filed on May 14, 2020, the contents of which are incorporated by reference herein in their entirety.

BACKGROUND

The present invention relates to telecommunications, and more particularly, to a power converter for generating supply voltages to support one or more subscriber lines.

In telecommunications systems, signals are transmitted between a subscriber station and a central switching office using a two-wire bi-directional communication channel. A line card typically connects the subscriber station to the central switching office, wherein the line card typically includes at least one subscriber line interface circuit (SLIC) and a subscriber line audio-processing circuit (SLAC).

The SLIC provides an interface between a low-voltage signal path in a telephone central office and a high-voltage telephone subscriber line. The SLIC typically provides functionality such as, off-hook detection, ringing signal generation and battery feed to the subscriber line. In order to provide this functionality, a low negative supply voltage and a high negative supply voltage are provided to the SLIC by a power converter. The low negative supply voltage is typically provided during an off-hook operation of the subscriber line and the high negative supply voltage is generally used during an on-hook operation. On-hook refers to when the subscriber line is idle and waiting for a signal indicating that someone wants to make a connection, and off-hook refers to when the subscriber line is active and the subscriber is trying to complete a connection or utilizing the connection. The system voltages are traditionally negative to prevent electromigration from eroding the installed copper wiring.

Power converters are known in the art to generate the low negative supply voltage and the high negative supply voltage from an input voltage utilizing pulse-width modulated switching circuitry in a buck-boost circuit topology. However, in the power converters known in the art, the magnitude of the high negative supply voltage is dependent upon both the magnitude of the low negative supply voltage and the magnitude of the input voltage. The contribution of the input voltage magnitude to the high negative supply voltage magnitude is generally such that an increase in the input voltage magnitude results in an increase in the magnitude of the high negative supply voltage provided to the SLIC. The contribution of the input voltage magnitude may be enough to increase the magnitude of the high negative supply voltage to a level requiring higher voltage-rated components, which are often more expensive, thereby increasing the cost of the power converter. Additionally, a higher negative supply voltage magnitude increases the stress on the components of the system.

Accordingly, there is a need in the art for a system and method for controlling the magnitude of a high negative supply voltage generated by a power converter comprising a buck-boost topology for use in a subscriber line telecommunication system.

SUMMARY OF THE INVENTION

In various embodiments, the present invention provides a system and method for generating a low supply voltage and a high supply voltage from an input voltage, wherein the dependency of the high supply voltage magnitude on the input voltage magnitude is removed and the resulting high supply voltage magnitude is a multiple of the low supply voltage magnitude. The low supply voltage and the high supply voltage may be provided by a power converter of a communication system comprising a plurality of subscriber line interface circuits (SLICs), and the low supply voltage magnitude and the high supply voltage magnitude may be negative.

In one embodiment, the present invention provides a power converter including a switching circuit to selectively provide an input voltage to a switching node based upon a modulated control signal to generate a low supply voltage at a first output node of a power converter. The power converter additional includes, an input voltage cancellation circuit coupled to the switching node, the input voltage cancellation circuit operable to cancel out the input voltage selectively provided to the switching node by the switching circuit, such that the switching node swings by an amount which is independent of an amplitude of the input voltage, and a boost circuit coupled to the switching node and to the switching circuit, the boost circuit operable to generate a high supply voltage at a second output node of the power converter, wherein the high supply voltage has a magnitude which is a multiple of a magnitude of the low supply voltage generated by the switching circuit.

In an additional embodiment, the present invention provides, a system including a plurality of subscriber line interface circuits (SLICs), each SLIC operable to communicate with a subscriber over one of a plurality of subscriber lines. The system further includes, at least one subscriber line audio processing circuit (SLAC) coupled to each of the plurality of SLICs, each SLAC is operable to generate a reference voltage based upon an operating condition received from one or more of the plurality of SLICs and, and a pulse width modulated (PWM) controller operable to receive the reference voltage from the SLAC and to generate a modulated control signal based upon the reference voltage. The system further includes, a power converter operable to receive the modulated control signal and an input voltage and to generate a low supply voltage and a high supply voltage, wherein the voltage converter comprises, a switching circuit to selectively provide the input voltage to a switching node based upon the modulated control signal to generate the low supply voltage at a first output node of the power converter, an input voltage cancellation circuit coupled to the switching node, the input voltage cancellation circuit operable to cancel out the input voltage selectively provided to the switching node by the switching circuit, such that the switching node swings by an amount which is independent of an amplitude of the input voltage, and a boost circuit coupled to the switching node and to the switching circuit, the boost circuit operable to generate the high supply voltage at a second output node of the power converter, wherein a magnitude of the high supply voltage is a multiple of a magnitude of the low supply voltage generated by the switching circuit.

In another embodiment, the present invention provides a method which includes, generating, by a switching circuit, a low supply voltage at a first output node of a power converter by selectively providing an input voltage to a switching node based upon a modulated control signal. The method further includes, cancelling out, by an input voltage cancellation circuit, the input voltage selectively provided to the switching node by the switching circuit, such that the switching node swings by an amount which is independent of an amplitude of the input voltage, and generating, by a boost circuit, a high supply voltage at a second output node of the power converter, wherein a magnitude of the high supply voltage is a multiple of a magnitude of the low supply voltage generated by the switching circuit. In a particular embodiment, the low supply voltage and the high supply voltage are provided to one or more subscriber line interface circuits (SLICs).

As such, the present invention provides an improved system and method for generating a low supply voltage and a high supply voltage from an input voltage, wherein the effect of the magnitude of the input voltage on the high supply voltage is removed and a magnitude of the high supply voltage is substantially a multiple of a magnitude of the low supply voltage.

BRIEF DESCRIPTION OF THE FIGURES

The invention will be explained in more detail in the following with reference to embodiments and to the drawing in which are shown:

FIG. 6 is a flow diagram illustrating the method for generating supply voltages of FIG. 5, in greater detail.

DETAILED DESCRIPTION OF THE INVENTION

Persons of ordinary skill in the art will realize that the following description is illustrative only and not in any way limiting. Other embodiments will readily suggest themselves to such skilled persons.

In various embodiments, the present invention provides a system and method for preventing a change in magnitude of an input voltage of a voltage converter from contributing to a change in magnitude of a high supply voltage generated by a boost circuit of the voltage converter. In particular, the voltage converter generates both a high supply voltage and a supply output voltage that are provided to one or more SLICs in a sub scriber line telecommunication system.

Figure 1:
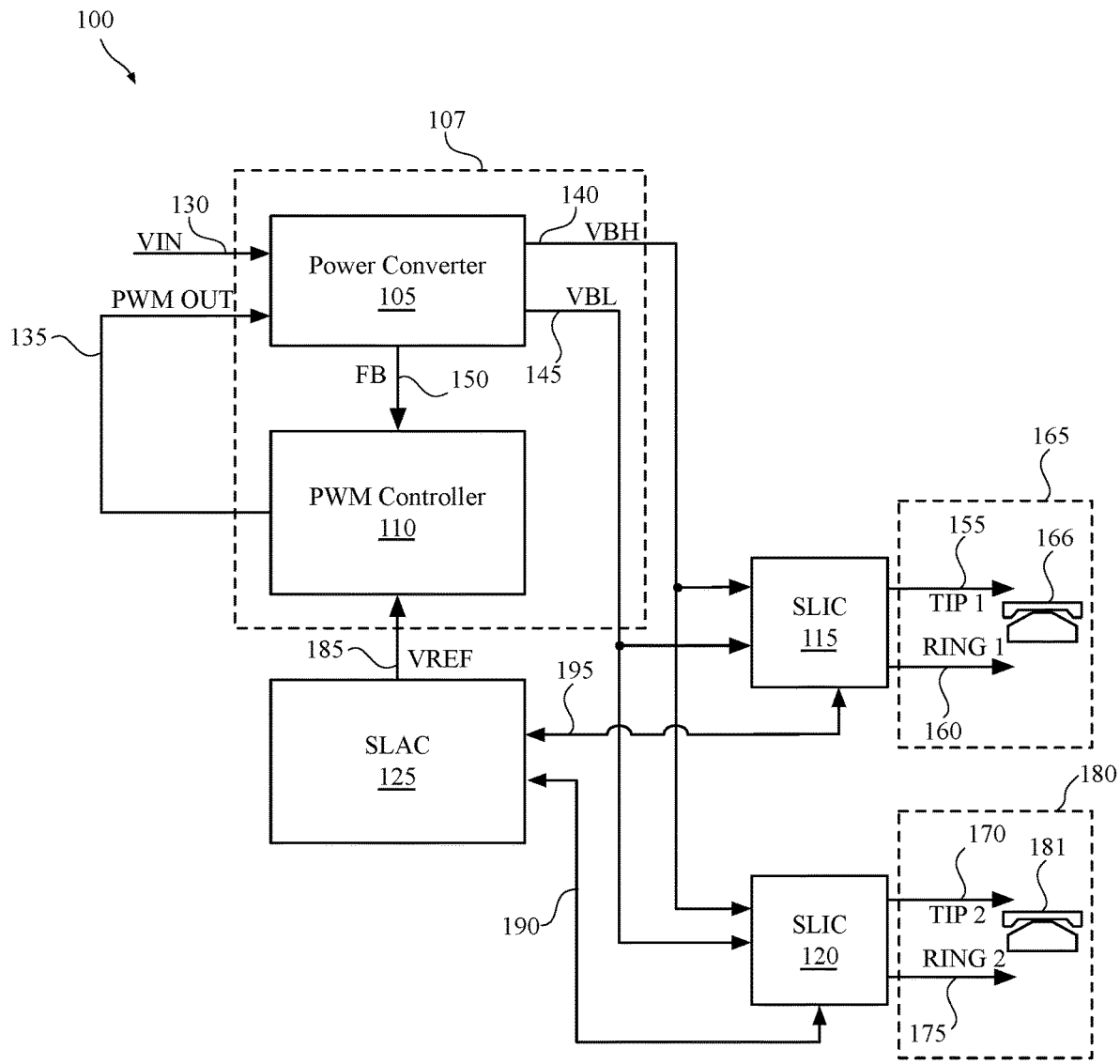
FIG. 1 is a block diagram illustrating a communication system comprising a plurality of subscriber line interface circuits (SLICs) and a power converter to provide supply voltages to the SLICs, in accordance with an embodiment of the present invention.

FIG. 1 is a simplified block diagram of a communication system 100 including a subscriber line audio-processing circuit (SLAC) 125, two subscriber line interface circuits (SLICs) 115, 120, and a voltage regulator 107. The voltage regulator 107 includes a power converter 105 and a pulse-width modulated (PWM) controller 110. The voltage regulator 107 generates a high supply voltage (VBH) 140 and a low supply voltage (VBL) 145 for use by the SLICs 115, 120 for supporting communication with subscriber telephone equipment 166, 181 over subscriber lines 165, 180, respectively. In particular a first subscriber line 165 includes a TIP 1 signal 155, a RING 1 signal and first subscriber telephone equipment 166 coupled across the TIP 1 signal 155 and the RING 1 signal 160 and a second subscriber line 180 includes a TIP 2 signal 170, a RING 2 signal 175 and second subscriber telephone equipment 181 coupled across the TIP 2 signal 170 and the RING 2 signal 175. The PWM controller 110 utilizes feedback (FB) 150 from the power converter 105 and a reference voltage (VREF) 185 from the SLAC 125 to generate a modulated control signal (PWM OUT) 135 to control the operation of the power converter 105. While only two SLICs 115, 120 are illustrated in FIG. 1, this is not intended to be limiting and additional SLICs and associated subscriber lines are within the scope of the present invention.

The general operation and configuration of SLIC devices 115, 120 and SLAC devices 125 are well known to those of ordinary skill in the art. As such, only a high-level description is provided herein. The SLICs 115, 120 provide power from the telephone central office to the subscriber lines 165, 180, respectively. In particular, first SLIC 115 provides an electrical interface for communication with first subscriber line 165 using the TIP 1 signal 155 and the RING 1 signal 160 and second SLIC 120 provides an electrical interface for communication with second subscriber line 180 using the TIP 2 signal 170 and the RING 2 signal 175. Typically, DC voltages are provided to the SLICs 115, 120 to power the SLICs 115, 120 and the subscriber lines 165, 180. For example, the low supply voltage (VBL) 145 and the high supply voltage (VBH) 140 are typically provided to the SLICs. 115, 120. VBL 145 is generally used during off-hook conditions of a subscriber line to support a call and VBH 140 is generally used during on-hook conditions of a subscriber line to support ringing at the subscriber line. It is understood that the VBH 140 and VBL 145 are commonly negative voltages when used in a subscriber line system, however for simplification, the presence or absence of the term "negative" and/or the negative symbol will be considered equivalent throughout the detailed description.

The SLAC 125 provides higher-level functions, including audio signal conversion and processing, impedance matching, call control signal generation and detection and voltage control. The SLAC 125 configures the PWM controller 110 with a desired voltage level, i.e. VREF 185, to establish the low supply voltage VBL 145 generated by the power converter 105. The high supply voltage VBH 140 is generated by the power converter based upon VBL 145. Because VBH 140 is generated based upon VBL 145, varying VREF 185, typically by varying the magnitude of VREF 185, without limitation, affects the voltage level, i.e., the magnitude, of both VBL 145 and VBH 140. The SLAC 125 adjusts VREF 185 in response to the operating states of the SLICs 115, 120. The operating states of the SLICs 115, 120 are provided over respective communication lines 195,190 between the SLAC 125 and the SLICs 115, 120.

The power converter 105 may be based upon a buck-boost topology, wherein a switching circuit is combined with a voltage multiplier circuit to generate both VBL 145 and VBH 140 from an input voltage (VIN) 130 and the modulated control signal (PWM OUT) 135 provided by the PWM controller 110. In a particular embodiment, the voltage multiplier circuit of the power converter 105 may be a voltage tripler boost circuit. Employing a voltage tripler boost circuit, the power converter 105 generates VBL 145 having a magnitude based upon the magnitude of VIN 130 and the modulated control signal (PWM OUT) 135 and generates VBH 140 having a magnitude that is nominally 3x the magnitude of VBL 145.

In an exemplary embodiment, assuming that the power converter 105 includes a voltage tripler boost circuit topology, during operation of the system 100, the SLAC 125 may set the value of VREF 185 to generate VBL 145 from the power converter 105, where VBL 145 has a voltage level that is approximately −25V when the SLICs 115, 120 are in an idle state (on-hook), i.e. with a magnitude of 25V. This VBL 145 voltage level of −25V corresponds to a VBH 140 voltage level of approximately −75V, i.e. a magnitude of approximately 75V. This VBH 140 voltage level is sufficient to support an on-hook tip/ring voltage of −48V with sufficient headroom to also transmit caller ID signals. If a subscriber line 165, 180 goes off-hook, its associated SLIC 115, 120 switches its voltage source from VBH 140 to VBL 145 to minimize power dissipation. When one of the SLICs 115, 120 is in a ringing state, the magnitude of VBH 140 needs to be higher to support the required peak ringing voltage, which is approximately −70V to −80V pk. As a result, the SLAC 125 increases VREF 185 to the PWM controller 110 to correspond to a voltage level for VBL 145 of approximately −30V, resulting in VBH 140 voltage level increasing to approximately −90V. The higher magnitude for VBH 140 provides sufficient headroom to support a clean sinusoidal ringing waveform. Additionally, other non-ringing subscriber lines, if idle, will use VBH 140 to maintain an on-hook voltage. If a non-ringing subscriber line becomes active (off-hook), it will use VBL 145 to provide loop current to the off-hook subscriber line. When the ringing line is no longer in the ringing state, the SLAC 125 adjusts VBL 145 voltage level back to −25V to reduce power consumption. The voltage levels of VBL 145 and VBH 140 are adjusted dynamically, so that in the case that any supported SLIC 115, 120 is in the ringing state the voltage levels of VBL 145 and VBH 140 are increased, and when none of the supported SLIC 115, 120 are in the ringing state the voltage levels of VBL 145 and VBH 140 are decreased to the nominal levels.

Figure 2A:
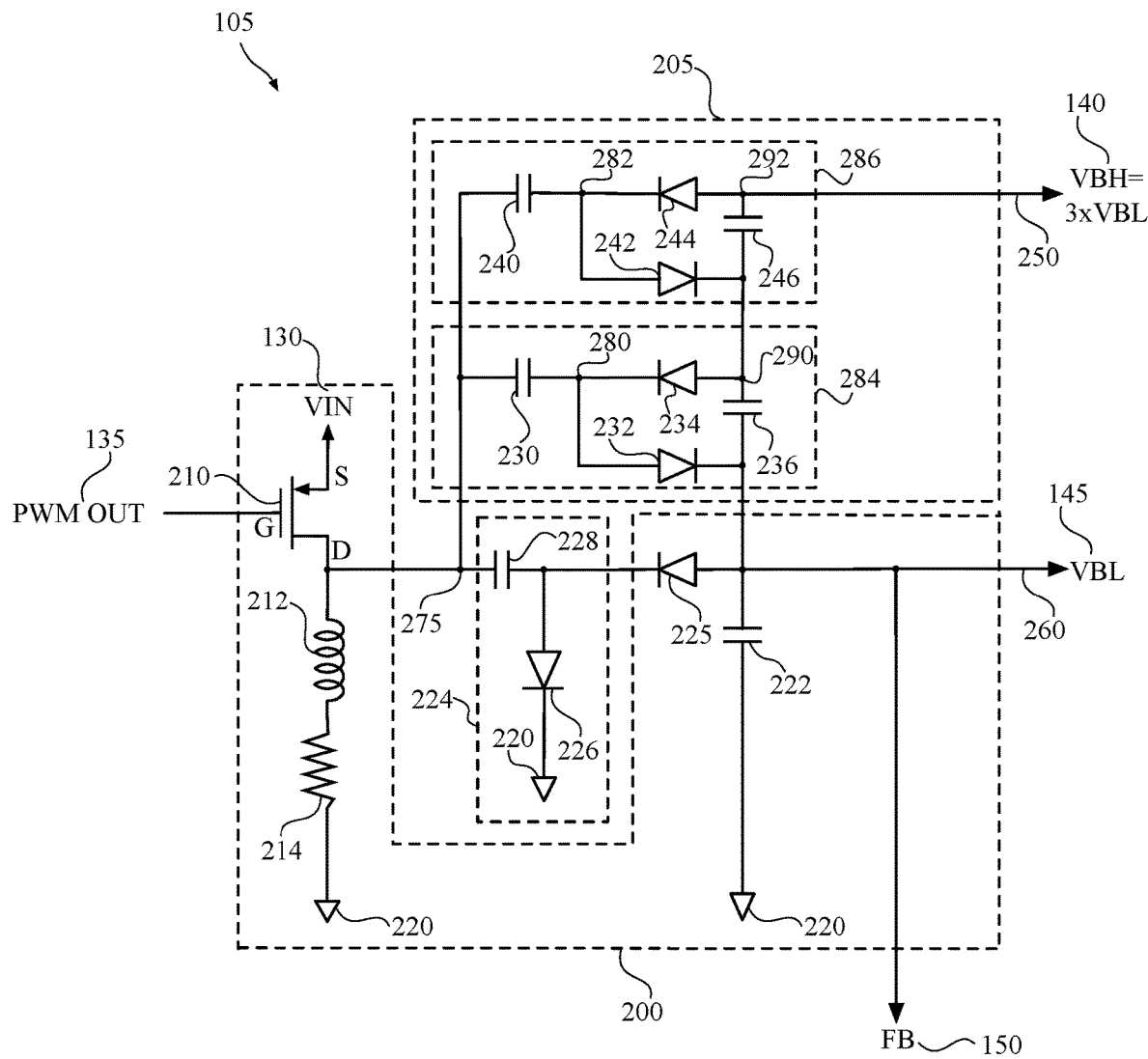
FIG. 2A is a schematic diagram illustrating a first exemplary circuit topology of a power converter.

FIG. 2A is a circuit diagram illustrating a first exemplary circuit topology of the power converter 105. The power converter 105 includes a switching circuit 200 for providing the VBL 145 at a first output node 260 of the power converter 105 and a boost circuit 205 for providing the VBH 140 at a second output node 250 of the power converter 105. The power converter 105 additionally includes an input voltage cancellation circuit 224. In a particular embodiment, the VBL 145 and the VBH 140 may be negative voltages which are provided to the SLICs 115, 120 of FIG. 1.

The switching circuit 200 of the power converter 105 selectively provides VIN 130 to a switching node 275 based upon a modulated control signal (PWM OUT) 135 to generate VBL 145. In a particular embodiment, the switching circuit 200 of the power converter 105 includes an energy storage element 212 coupled between the switching node 275 and a ground node 220, through a resistive element 214. The switching circuit 200 further includes a switching element 210 coupled between the VIN 130 and the energy storage element 212. A first capacitor 222 is coupled between the first output node 260 of the switching circuit 200 and the ground node 220 and a first diode 225 is coupled between the input voltage cancellation circuit 224 and the first output node 260 of the power converter 205.

In a particular embodiment, the energy storage element 212 of the switching circuit 200 may be an inductor. The switching element 210 may be a metal-oxide semiconductor field-effect transistor (MOSFET) and in particular a p-channel MOSFET having a gate terminal coupled to the modulated control signal (PWM OUT) 135 from the PWM controller 110 (not shown), a source terminal coupled to VIN 130 and a drain terminal coupled to the switching node 275 and a first terminal of the energy storage element 212.

The input voltage cancellation circuit 224 of the power converter 105 is coupled to the switching node 275 and is operable to cancel out the input voltage 130 that is selectively provided to the switching node 275 by the switching circuit 200 responsive to the state of the modulated control signal (PWM OUT) 135. The input voltage cancellation circuit 224 includes a second capacitor 228 and a second diode 226. A first terminal of the second capacitor 228 is coupled to the switching node 275 and the second diode 226 is coupled to conduct current in forward bias between a second terminal of the second capacitor 228 and the ground node 220.

The boost circuit 205 of the power converter 105 is coupled to the switching node 275 and to the switching circuit 200. The boost circuit 205 is operable to generate a high supply voltage VBH 140 at the second output node 250 of the power converter 105. In a particular embodiment, the boost circuit 205 includes two or more boost stages 284, 286 each including a respective pump capacitor coupled between the switching node 275 and a respective charge pump node, a respective charge state diode coupled to conduct current from the respective charge pump node to the first output node 260 of the power converter 205 in forward bias, a respective discharge state diode coupled to conduct current from a respective intermediate node to the respective charge pump node in forward bias, and a respective boost capacitor coupled between the respective intermediate node and the first output node 260. In the particular embodiment of FIG. 2A, the boost circuit 205 is a voltage tripler boost circuit including a first boost stage 284 and a second boost stage 286. In this particular embodiment, the first boost stage 284 includes a first pump capacitor 230 coupled between the switching node 275 and a first charge pump node 280, a third diode 232 (charge state diode) coupled to conduct current in forward bias from the first charge pump node 280 to the first output node 260, a fourth diode 234 (discharge state diode) coupled to conduct current from a first intermediate node 290 to the first charge pump node 280 in forward bias and a first boost capacitor 236 coupled between the first intermediate node 290 and the first output node 260.

In this particular embodiment, the second boost stage 286 includes a second pump capacitor 240 coupled between the switching node 275 and a second charge pump node 282, a fifth diode 242 (charge state diode) coupled to conduct current in forward bias from the second charge pump node 282 to the first intermediate node 290, a sixth diode 244 (discharge state diode) coupled to conduct current in forward bias from a second intermediate node 292 to the second charge pump node 282 and a second boost capacitor 246 coupled between the second intermediate node 292 and first intermediate node 290. Second intermediate node 292 is coupled to second output node 250 and provides high supply voltage VBH 140. In operation of the second boost stage 286, when the fifth diode 242 of the second boost stage 286 is forward biased it conducts current to first intermediate node 290. This current then flows into the first boost capacitor 236 of the first boost stage 284 and then on to the first capacitor 222 at the first output node 260 of the switching circuit 200.

In general, each boost stage of the boost circuit 205 is coupled to the next one below it. For each boost stage 284, 286, when the respective diode 232, 242 is forward biased, current flows into the next lower stages respective boost capacitor 236, 222. Accordingly, each boost stage carries the sum of the current from all boost stages above it and, as such, the first capacitor 222 must handle the sum of all the current from the upper boost stages.

While a voltage tripler boost circuit is illustrated in FIG. 2A, this is not intended to be limiting and other boost circuits comprising at least one boost stage are within the scope of the present invention.

In order to generate VBL 145 and VBH 140, the switching circuit 200 of the power converter 105 charges the energy storage element 212 from the input voltage 130 during a charging cycle and discharges the energy storage element 212 during a discharging cycle. The charging cycle and discharging cycle are defined by the modulated control signal (PWM OUT) 135 from the PWM controller 110 and the PWM controller 110 sets the duty cycle of the modulated control signal (PWM OUT) 135 to control the magnitude of VBL 145 based upon feedback (FB) 150, which may be an electronic signal carrying the voltage level of VBL 145, or a signal carrying information reflecting the voltage level of VBL 145. During the discharging cycle the energy stored in the energy storage element 212 is transferred to first capacitor 222 through first diode 225 to generate VBL 145 at the first output node 260 of the power converter 105. In particular, right before the switching element 210 is turned off, current is flowing through the switching element 210 and through the energy storage element 212 to the ground node 220. When the switching element 210 turns off, since the current in the energy storage element 212 can't change instantaneously, but the voltage can, the polarity of the energy storage element 212 reverses. In response, the switching node 275 becomes negative with respect to the ground node 220 and diode 225 becomes forward biased, since the voltage across capacitor 228 is equal to VIN, less the voltage drop across diode 226, thereby allowing the energy stored in the energy storage element 212 to be transferred to the first capacitor 222. The bias on capacitor 228 provides for the cancellation of the input voltage VIN 130 by the input voltage cancellation circuit 224. The switching frequency of the switching circuit 200 is such that the bias on capacitor 228 does not have adequate time to discharge. As such, the bias on capacitor 228 appears to be substantially constant.

A first terminal of each of pump capacitors 230, 240 of the boost circuit 205 are coupled to the switching node 275. Pump capacitors 230, 240 are coupled through diodes 232, 242, respectively, to boost capacitors 236, 246, respectively, which boost capacitors 236, 246 are coupled in series, for generating VBH 140 at the second output node 250 of the power converter 105.

In general, the circuit of FIG. 2A illustrates a power converter 105 incorporating a single switch inverting buck-boost topology that is used to convert a positive input voltage VIN 130 to a low negative supply voltage VBL 145 and a high negative supply voltage VBH 140. The boost circuit 205 in this exemplary embodiment is a tripler configuration that is designed to generate a high supply voltage VBH 140 having a magnitude that is approximately three times the magnitude of VBL 145. For example, the power converter 105 of FIG. 2A may convert a VIN 130 of +12V to a VBL 145 of approximately −30V and to a VBH 140 of approximately −90V VBH. While a tripler configuration is illustrated in FIG. 2A, any number of multiplier stages are within the scope of the present invention. Additionally, any number of high negative supply voltage that are different multiples of VBL 145 could be accessed from the multiplier stages of the power converter 105.

The magnitude of VBL 145 is regulated by the PWM controller 110 by sampling the magnitude of VBL 145 at the first output node 260 to generate feedback (FB) 150, which as indicated above may be an electronic signal. The PWM controller 110 establishes the duty cycle for the switching element 210, including a charging cycle (ON time for the switching element 210) and a discharging cycle (OFF time for the switching element 210). In some embodiments, the PWM controller 110 may utilize a fixed frequency variable pulse width signal, where the modulated control signal (PWM OUT) 135 is used to control the ON time of the switching element 210 to affect how much the energy storage element 212 is charged. Increasing the ON time, i.e. the charging time, increases the power delivered from VBL 145 and decreasing the ON time, i.e. the charging time, decreases the power delivered from VBL 145. As such, the PWM controller 110 sets the duty cycle depending on the loading on VBL 145. The PWM controller 110 monitors the voltage level of VBL 145 through feedback (FB) 150 and adjusts the duty cycle of the modulated control signal (PWM OUT) 135 to maintain the appropriate voltage level.

Figure 2B:
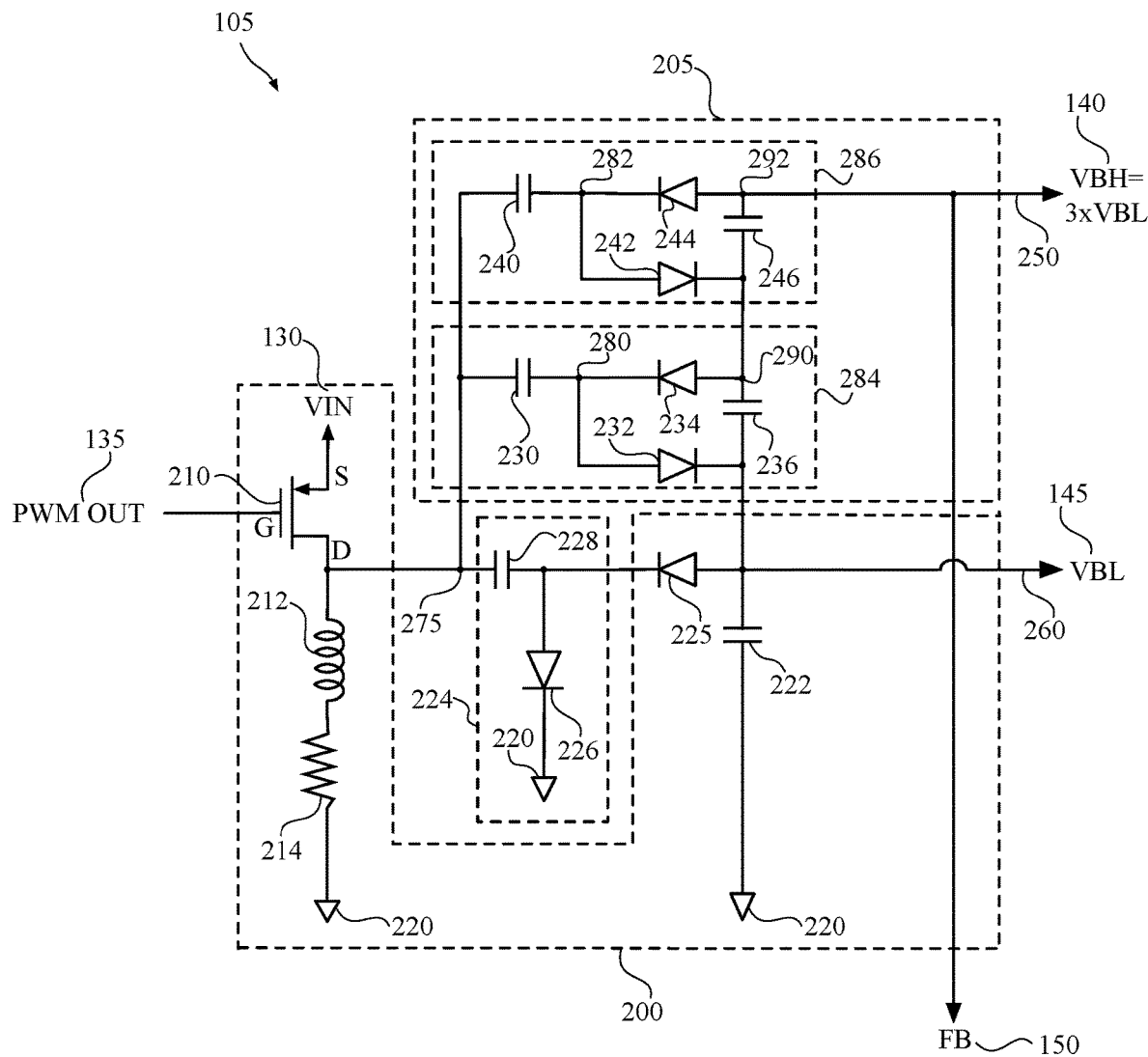
FIG. 2B is a schematic diagram illustrating a second exemplary circuit topology of a power converter.

While FIG. 2A describes monitoring VBL 145 to maintain the appropriate voltage level, this is not meant to be limiting in any way, and in another embodiment VBH 140 may be monitored, as is shown in FIG. 2B. As illustrated in the second exemplary circuit topology of the power converter 105 shown in FIG. 2B, the PWM controller 110 monitors the voltage level of VBH 140 through feedback (FB) 150 and adjusts the duty cycle of the modulated control signal (PWM OUT) 135 to maintain the appropriate voltage level. The determination of whether to monitor VBL 145, as in FIG. 2A, or VBH 140, as in FIG. 2B, is dependent upon which of the two voltages is required to be better regulated. Since VBH 140 is only coupled to VBL 145 through the charge pumps of the boost circuit 105, a heavy load on VBH 140 would results in greater voltage variation on VBH 140, but VBL 145 would not be affected by the heavy load. In some embodiments, VBL 145 needs to be well regulated and voltage variation can be tolerated on VBH 140, however, in other embodiments VBH 140 needs to be well regulated and voltage variation can be tolerated on VBL 145. When output VBL 145 needs to be well regulated, VBL 145 is monitored and used to maintain the appropriate voltage level, as shown in FIG. 2A. Alternatively, when VBH 140 needs to be well regulated, VBH 140 is monitored and used to maintain the appropriate voltage level as is illustrated in FIG. 2B.

While the magnitude of VBH 140 is approximately a multiple of VBL 145, without the input voltage cancellation circuit 224 of the present invention, the magnitude of VIN 130 also contributes to voltage level of VBH 140. In particular, incorporating multiple boost stages into an inverter buck-boost topology compromises the ability of the power converter 105 to accurately control the voltage level of VBH 140 because the addition of multiple boost circuits results in an output voltage that is a multiple of the magnitude of VBL 145, plus a multiple of the magnitude of VIN 130, wherein the multiple is determined by the number of boost stages. For example, in FIG. 2A, disregarding the operation of input voltage cancellation circuit 224, the magnitude of VBH 140 is equal to 3×VBL plus 2×VIN. If the objective is to generate VBH 140 with the highest magnitude possible, then such a boost configuration is acceptable. However, this also means that any variation in the magnitude of VIN 130 will have twice the effect on the magnitude of VBH 140. For example, if VBL is −25V and VIN 130 is +12V, then the magnitude of VBH 140 will be −99V (VBH=3×VBL+2×VIN), and if VIN 130 rises to 15V, i.e. a change of 3 volts, then the magnitude of VBH 140 will be −105V, i.e. a change in magnitude of 6 volts.

While in the illustrated embodiment, disregarding the operation of input voltage cancellation circuit 224, VBH=3× VBL+2×VIN, it is understood that the multiplier of VIN is determined by the number of boost stages of the boost circuit 205. In the example of a tripler boost circuit, the multiplier of VIN is "2". However, in the case of a doubler boost circuit, the multiplier of VIN would be "1". In general, the multiplier of VIN for determining VBH is equal to "N−1", wherein N is the number of boost stages of the boost circuit 205.

The magnitude of VIN 130 contributes to the magnitude of VBH 140 because during the charging cycle of the energy storage element 212, the switching element 210 is turned ON and the voltage at the switching node 275 corresponds to VIN 130 (e.g. 12V). The voltage level at the first charge pump node 280 will be more positive than VBL 145 when the switching element 210 is turned ON and the voltage at the switching node 275 swings to VIN, which is positive. The voltage level at the first charge pump node 280 of the boost circuit 205 corresponds nominally to VBL 145, plus the forward diode drop of third diode 232, and the voltage at the second charge pump node 282 of the boost circuit 205 corresponds nominally to 2×VBL 145, less the forward diode drop of the third diode 232 and the fifth diode 242. Fourth and sixth diodes 234, 244 are reverse biased, thereby preventing current from flowing to boost capacitors 236, 246, respectively. Since the voltage at the switching node 275 is VIN 130 and the voltage at the first charge pump node 280 is VBL 145, the voltage across pump capacitor 230 is approximately equal to the magnitude of VBL 145 plus the magnitude of VIN 130 (ignoring the diode drops). As such, while the energy storage element 212 is charging, the third diode 232 allows first pump capacitor 230 to be charged up to approximately the sum of the magnitudes, VBL+VIN, with fourth diode 234 being reverse biased. Similarly, while the energy storage element 212 is charging, the fifth diode 242 allows pump capacitor 240 to be charged up to approximately the sum of the magnitudes, 2*(VBL+VIN), with sixth diode 244 being reverse biased. However, the additional voltage contributed by 2*VIN 130 to VBH 140 may be undesirable due to increased component costs, because components rated for higher voltages are typically more expensive and would therefore increase the overall cost of the power converter 105. Additionally, reducing the magnitude of VBH 140 would also reduce the stress on the other components of the system. Additionally, it is desired to reduce, and preferably eliminate, the variation of VBH 140 based on variation of VIN 130.

In the present embodiments, the contribution of VIN 130 to VBH 140 is removed by implementing the input voltage cancellation circuit 224. The second capacitor 228 and grounded second diode 226 of the input voltage cancellation circuit 224 are coupled to the switching circuit 200. The addition of the input voltage cancellation circuit 224 removes the dependency of VBH 140 on VIN 130, and VBH 140 simply becomes 3×VBL 145. The input voltage cancellation circuit 224 effectively cancels out VIN 130 at the switching node 275 during the discharging cycle of the energy storage element 212. By cancelling out VIN at the switching node 275 during the discharging cycle, such that during the discharge cycle switching node 275 switches from +VIN to VBL+VIN (i.e. to VIN above negative voltage VBL) first intermediate node 290 will be charged to 2*VBL and second intermediate node 292 will be charged to 3*VBL. The charge (i.e. the voltage) stored across each of the pump capacitors 230, 240 contributes additively to the generation of VBH 140 during the discharging cycle. As such, by implementing the input voltage cancellation circuit 224 into the power converter 105, the voltage level of VIN 130 does not contribute to the magnitude of VBH 140. The phrase cancelling out, as used throughout this document, means effectively removing the dependency of the magnitude of VBH 140 from the magnitude of VIN 130.

Reducing the magnitude of VBH 140 also reduces the drain-to-source voltage of the switching element 210. While a traditional buck-boost circuit requires the switching element 210 to be rated to VIN-VBL, the input voltage cancellation circuit 224 reduces the requirement to only the magnitude of VBL. Using the previous example, if the switching element 210 is a MOSFET and if VBL is −25V and VIN is 12V, then the drain-to-source of the MOSFET would be 37V. A drain-to-source ($V_{dss}$) rating of 37V would require that a MOSFET be used in the switching circuit 200 that is rated at a minimum of 50V $V_{dss}$, to handle ringing, and more likely 60V $V_{dss}$, which is more common. With the inclusion of the input voltage cancellation circuit 224 of the present invention, the MOSFET rating is reduced to 40V, which is sufficient to handle ringing. Keeping component ratings under 100V results in significantly reduced cost, as compared to conventional circuits and system with components rated over 100V. Additionally, voltage stress on the other capacitors and diodes in the system is also reduced by incorporating the input voltage cancellation circuit 224.

Figure 3:
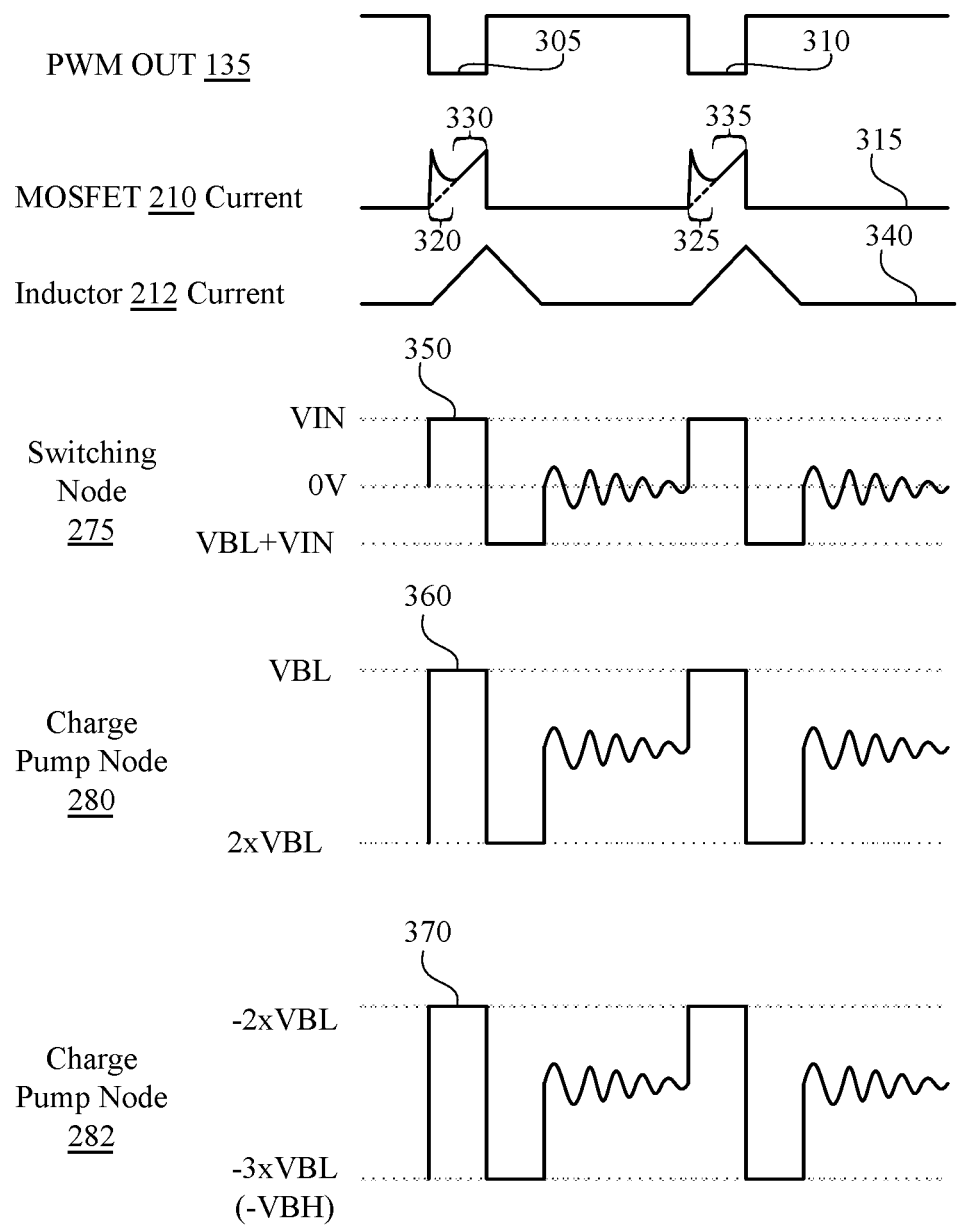
FIG. 3 is diagram illustrating signal diagrams for various nodes within the power converter illustrated in FIG. 2A.

FIG. 3 illustrates the operation of the power converter 105 in providing the low supply voltage VBL 145 and the high supply voltage VBH 140. FIG. 3 illustrates the modulated control signal (PWM OUT) 135 from the PWM controller 110, the current at the switching element 210 and the current at the energy storage element 212. In addition, the voltage at the switching node 275 of the switching circuit 200 and the voltage at the charging nodes 280, 282 of the boost circuit 205 are illustrated.

The modulated control signal (PWM OUT) 135 modulates the application of input voltage VIN 130 to the energy storage element 212. In this embodiment, MOSFET 210 is a p-channel MOSFET and as such, the switch is ON and a charging cycle of the energy storage element 212 is initiated when the modulated output signal (PWM OUT) 135 is low 305, 310. When the PWM OUT 135 is low 305, 310, the current through the MOSFET 210 is the sum of the currents through energy storage element 212, second capacitor 228 and first capacitor 222. The leading current spike 320, 325 at turn-on of the MOSFET 210 is due to current flowing in capacitors 222, 228. The latter part 330, 335 of the MOSFET 210 current waveform 315 is the energy storage element 212 current after the capacitors 222, 228 currents have stopped flowing. The rectangular pulses 305, 310 of the modulated output signal (PWM OUT) 135 modulate the application of VIN 130 to the energy storage element 212, resulting in a triangular current waveform 340 at the energy storage element 212.

In operation, during a charging cycle of the energy storage element 212, the modulated control signal 135 is low 305, 310 and the energy storage element 212 is charged, as evidenced by the energy storage element 212 current signal 340 increasing. The current signal 340 of the energy storage element 212 ramps at a rate controlled by the on time of the modulated control signal (PWM OUT) 135 and the inductance of the energy storage element 212, wherein current ramp rate is a function of VIN 130, the inductance of the energy storage element 212 and the resistance of resistive element 214, and the modulated control signal (PWM OUT) 135 sets the peak current in the energy storage element 212 by varying ON and OFF time. The voltage at the switching node 275, as evidenced by signal 350 steps from 0V to VIN when the MOSFET 210 is ON. The voltage at the first charge pump node 280 charges to VBL when the MOSFET 210 is ON, as evidenced by signal 360. The voltage at the second charge pump node 282 charges to 2×VBL when the MOSFET 210 is ON, as evidenced by signal 370, and therefore the voltage across second pump capacitor 240 is |2*VBL|+VIN. The voltage across second capacitor 228 is VIN, since second diode 226 prevents the node common to first and second diodes 225, 226 from rising above the potential of ground node 220.

When the modulated control signal 135 switches high, the MOSFET 210 is turned OFF, the magnetic field of the energy storage element 212 collapses and the voltage at the switching node 275 reverses polarity. As evidenced by signal 350, when the MOSFET 210 is turned OFF, the switching node 275 drops to VBL+VIN because the second capacitor 228 is charged to the approximately VIN 130, therefore creating an offset equivalent to VIN between the first output node 260 and the switching node 275. The voltage swing at switching node 275 is thus equal to VBL, irrespective of VIN, and boost circuit 205 provides a multiple of the voltage swing at second output node 250. The input voltage cancellation circuit 224 prevents the switching node 275 from dropping to VBL 145 during the discharge cycle because during the charging cycle, VIN 130 at the switching node 275 is cancelled out through the input voltage cancellation circuit 224, resulting in a voltage across first pump capacitor 230 of the boost circuit 205 being held at VIN-VBL. For example, in VIN 130 is equal to +12V and VBL 145 is equal to −30V, then the voltage across the first pump capacitor 230 will be equal to 42V. By reducing the voltage across second pump capacitor 240 to VIN 130−(2×VBL 145) using the input voltage cancellation circuit 224, the contribution of VIN 130 to VBH 140 is cancelled out and the magnitude of VBH 140 is approximately equal to 3×VBL 145. When the energy storge element 212 discharges, current flows out of the energy storage element 212 through the resistive element 214 to the ground node 220. Additionally, current flows from the ground node 220, through the first capacitor 222, through first diode 225, through second capacitor 228 and back to the energy storage element 212. The bias on the second capacitor 228 during the charging cycle creates a differential between switching node 275 and VBL 145, which is equal to VIN 130.

Accordingly, for the voltage tripler topology illustrated in FIG. 2 having two boost stages 284, 286, when the input voltage cancellation circuit 224 is implemented in the power converter 105, if VIN 130 is equal to +12V, or any other voltage level within normal operating ranges, and VBL 145 generated by power converter 105 is −25V, supply voltage VBH 140 generated by the power converter 105 will be at a voltage level of −75V, which is 3×VBL 145. As such, VBH 140 generated by the power converter is reduced by 2×VIN 130 when the input voltage cancellation circuit 224 is included in the power converter 105 as opposed to when input voltage cancellation circuit 224 is not included. It follows that in a topology comprising a plurality of boost stages and implementing the power converter 105 of the present invention, the contribution of VIN 130 to VBH 140 will be removed and VBH 140 generated by the power converter 105 will be a multiple of VBL 145.

Figure 4:
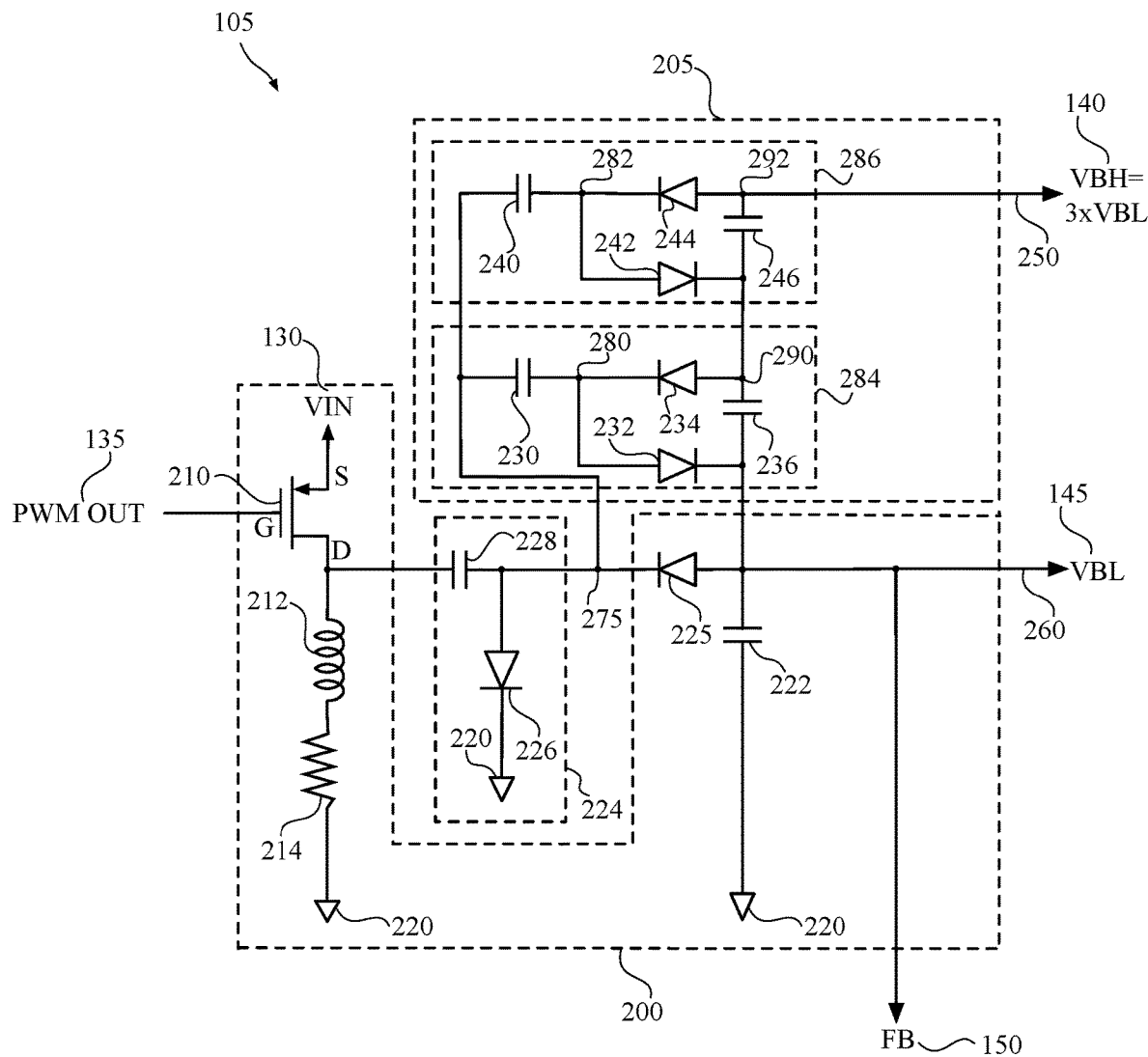
FIG. 4 is a schematic diagram illustrating a third exemplary circuit topology of a power converter.

In the embodiment described with reference to FIG. 2A and FIG. 2B, the switching node 275 is positioned between the switching element 210 of the switching circuit 200 and the input voltage cancellation circuit 224. In an alternative embodiment, shown in FIG. 4, the switching node 275 may be positioned between the input voltage cancellation circuit 224 and the first diode 225 of the switching circuit 200, essentially moving the switching node to the opposite side of second capacitor 228. In this embodiment, the switching circuit 200 of the power converter 105 also selectively provides VIN 130 to the switching node 275 based upon a modulated control signal (PWM OUT) 135 to generate VBL 145 and the input voltage cancellation circuit 224 of the power converter 105 is also operable to cancel out the input voltage 130 that is selectively provided to the switching node 275 by the switching circuit 200 responsive to the state of the modulated control signal (PWM OUT) 135. However, is this embodiment, the voltage across the first pump capacitor 230 and is limited to VBL 145 and the voltage across the second pump capacitor 240 is limited to 2×VBL 145, thereby further reducing the voltage stress on both pump capacitors 230, 240. Implementing the alternate embodiment illustrated in FIG. 4 may require a higher capacitance value for the second capacitor 228 because the second capacitor 228 will now be connected in series with both pump capacitors 230, 240.

Figure 5:
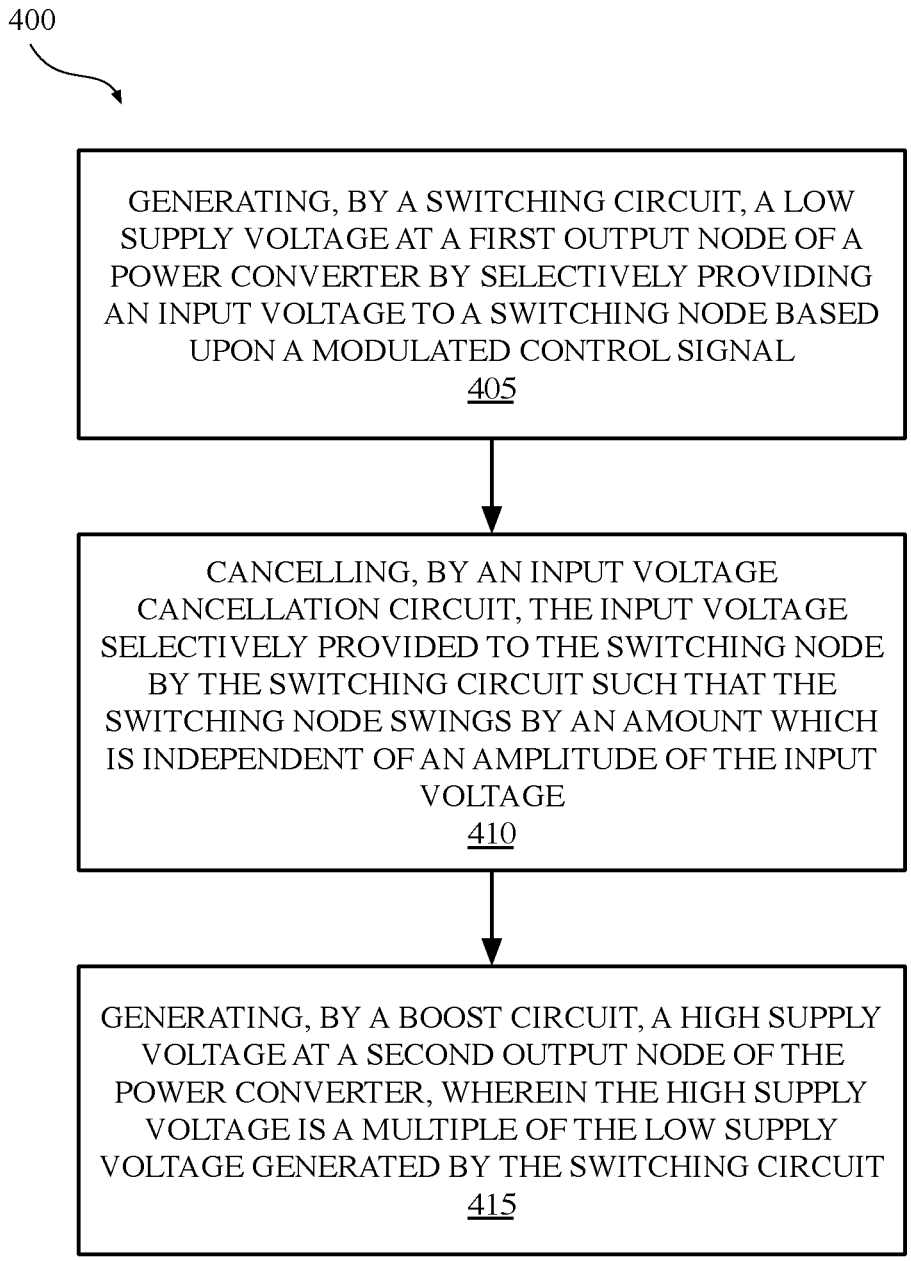
FIG. 5 is a flow diagram illustrating a method for generating supply voltages.

Referring now to FIG. 5, a flow diagram shows an illustrative method 400 for generating a low supply voltage and a high supply voltage from an input voltage, while also removing the contribution of the magnitude of the input voltage to the magnitude of the high supply voltage.

At 405 the method begins by generating, by a switching circuit, a low supply voltage at a first output node of a power converter by selectively providing an input voltage to a switching node based upon a modulated control signal. With reference to FIG. 2, the switching circuit 200 includes a switching element 210 that receives an input voltage (VIN) 130 and selectively provides the input voltage (VIN) 130 to a switching node 275 based upon the modulated control signal (PWM OUT) 135. The switching circuit 200 generates the low supply voltage (VBL) 145 from the input voltage 130 and provides VBL 145 to the first output node 260 of the power converter 105.

The method continues at 410 by cancelling out, by an input voltage cancellation circuit, the input voltage selectively provided to the switching node by the switching circuit. As shown in FIG. 2, input voltage cancellation circuit 224 is coupled to the switching node 275 to cancel out, or remove, the input voltage that is present on the switching node 275, so that the swing of switching node 275 is unaffected by the magnitude of the input voltage (VIN) 130 and reflects the low supply voltage (VBL) 145.

The method continues at 415 by generating, by a boost circuit, a high supply voltage at a second output node of the power converter, wherein the high supply voltage is a multiple of the low supply voltage generated by the switching circuit. With reference to FIG. 2, the boost circuit 205 generates the high supply voltage (VBH) 140 and provides VBH 140 to the second output node 250 of the power converter 105, wherein VBH 140 is a multiple of VBL 145.

With reference to FIG. 6, a flow diagram 500 describing steps for generating VBL 145 and VBH 140 from the input voltage 130 is illustrated in more detail.

At 505 the method begins by activating and deactivating a switching element of the switching circuit based upon the modulated control signal to establish a duty cycle in the switching circuit, the duty cycle comprising a charging cycle and a discharging cycle. With reference to FIG. 2A, the switching element 210 is controlled by the modulated control signal 135 to establish a duty cycle in the switching circuit 200 that establishes a charging cycle and a discharging cycle. The establishment of the duty cycle is further illustrated with reference to FIG. 3, where switching ON and OFF of the switching element 210 is shown.

At 510 the method continues by charging an energy storage element of the switching circuit during a charging cycle of the switching circuit. Following the charging of the energy storage element, at 515 the method continues by discharging the energy storage element through a first diode and to a first capacitor of the switching circuit during the discharging cycle, to generate the low supply voltage at the first output node of the power converter. With reference to FIG. 2A, the switching element 210 provides the input voltage 130 to the energy storage element 212 during a charging cycle to charge the energy storage element 212. Based upon the duty cycle, when the switching element 210 is turned OFF, the energy storage element 212 discharges through the first diode 225 and the first capacitor 222 of the switching circuit 200 to generate VBL 145 at the first output node 260 of the power converter 105. In particular, current flows from the ground node 220, through the first capacitor 222, through diode 225, through second capacitor 228 and back to the energy storage element 212.

During the charging of the energy storage element 212, the method continues at 520 by charging a second capacitor of the input voltage cancellation circuit to establish a bias on the second capacitor having a magnitude equal to the input voltage and then at 525 the methods continues by preventing the switching node from dropping to the low supply voltage during the discharging cycle by maintaining an offset across the second capacitor equal to the magnitude of the input voltage. This further ensures that the voltage swing at the switching node reflects the generated low supply voltage without reference to the magnitude of the input voltage. As shown in FIG. 2A, the input voltage cancellation circuit 224 is coupled to the switching node 275 and during the charging cycle a voltage equivalent to VIN is charged there across. During the discharge cycle, the switching node 275 only swings by an amount equal to VBL 145 (i.e., from +VIN 130 to +VIN 130+VBL 145) to produce VBL 145 because the second capacitor 228 has a bias equal to the input voltage VIN 130. The input voltage VIN 130 bias on the second capacitor 228 sums with the peak negative voltage at switching node 275 to create VBL 145. This results in switching node 275 swinging between the input voltage VIN 130 and VIN+VBL, for a swing of VBL.

During the charging of the energy storage element 212, at operation 510, the method continues at 530 by establishing a voltage across a pump capacitor of each of a plurality of boost stages of the boost circuit during the charging cycle, wherein the voltage across the pump capacitor is substantially equal to a multiple of the low supply voltage plus the magnitude of the input voltage. The method continues at 535 by generating the high supply voltage, that is a multiple of the low supply voltage, and is independent of the magnitude of the input voltage. As shown in FIG. 2A, a voltage is established across the first pump capacitor 230 of one of the plurality of boost stages 284 of the boost circuit 205 during the charging of the energy storage element 212. Because the input voltage cancellation circuit 224 cancels out the magnitude of the input voltage VIN 130 from the magnitude of the voltage swing of the switching node 275 during the charging cycle, the voltage across the first pump capacitor is 230 substantially equal to VIN-VBL, as such the voltage across the first pump capacitor 230 is substantially equal to a multiple (in this case "1") of the low supply voltage VBL 145 plus the magnitude of the input voltage VIN 130. The cancellation circuit 224 reduces the voltage swing at switching node 275 by VIN 130. Since VIN 130 has been removed, the voltage swing at switching node 275 is equal to VBL 145. Additionally, the voltage across the second pump capacitor 240 is VIN-(2*VBL). As such, the voltage across the second pump capacitor 240 is substantially equal to a multiple (in this case "2") of the low supply voltage VBL 145 plus the magnitude of the input voltage VIN 130.

Based upon the duty cycle, when the switching element 210 is turned OFF, the charge stored in the energy storage element 212 flows through the second capacitor 228, the first pump capacitor 230 and the second pump capacitor 240. The current from the second pump capacitor 240 flows through the sixth diode 244 to the second boost capacitor 246, through the first capacitor 222 of the switching circuit 200 and then to the ground node 220. The current from the first pump capacitor 230 flows through the fourth diode 234 to the first boost capacitor 236, through the first capacitor of the switching circuit 200 and then to the ground node 220. When the switching element 210 is OFF, the voltage at the switching node 275 swings from +12V to −18V, i.e. from VIN to VIN+VBL. This is due to the energy storage element 212 forcing the switching node 275 negative during its discharge period. This sums with the bias voltages on the first pump capacitor 230 and the second pump capacitor 240 to produce the output voltages. For example, assuming VIN 130 is equal to +12V and VBL 145 is equal to −30V, then the voltage on the first pump capacitor 230 is equal to 42V (VIN−VBL=42V), and the voltage on the second pump capacitor 240 is equal to 72V (VIN−2*VBL). The polarity of the pump capacitors 230, 240 is such that the switching node 275 is positive relative to the first charge pump node 280 and the second charge pump node 282. In the case of the second pump capacitor 240, −18V at the switching node 275 plus −72V bias on the second pump capacitor 240=−90V, which is the voltage at the second charge pump node 282 and one diode drop less than the voltage at the second intermediate node 292 (VBH). The current then flows through the series combination of capacitors 246, 236 and 222. In the case of the first pump capacitor 230, −18V at the switching node 275 plus −42V bias on the first pump capacitor 230=−60V, which is the voltage at the first charge pump node 280 and one diode drop less than the voltage at the first intermediate node 290. The current then flows through the series combination of capacitors 236 and 222. In the case of the second capacitor 228, −18V at the switching node 275 plus −12V bias on the second capacitor 228=−30V (VBL).

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A power converter comprising:
   a switching circuit to selectively provide an input voltage to a switching node at a switching frequency to establish a charging cycle and a discharging cycle based upon a modulated control signal to generate a low supply voltage having a low supply voltage magnitude at a first output node of a power converter, wherein the switching circuit comprises a first capacitor coupled between the first output node of the power converter and a ground node;

an input voltage cancellation circuit coupled to the switching node, wherein the switching circuit further comprises a first diode coupled between the input voltage cancellation circuit and the first output node of the power converter, wherein the input voltage cancellation circuit comprises a second capacitor coupled between the switching node and the first diode and a second diode coupled between the second capacitor and the ground node, and wherein the switching frequency of the switching circuit is such that a bias on the second capacitor does not have adequate time to discharge during the discharging cycle of the switching circuit so as to maintain an offset across the second capacitor equal to the input voltage thereby cancelling out the input voltage selectively provided to the switching node by the switching circuit such that the switching node swings by an amount which is independent of an amplitude of the input voltage; and a boost circuit coupled to the switching node and to the switching circuit, the boost circuit operable to generate a high supply voltage having a high supply voltage magnitude at a second output node of the power converter, wherein the high supply voltage magnitude is a multiple of the low supply voltage magnitude.

2. The power converter of claim 1, wherein the magnitude of the high supply voltage is independent of a magnitude of the input voltage.

3. The power converter of claim 1, wherein a voltage swing of the switching node is substantially equal to the low supply voltage magnitude.

4. The power converter of claim 1, wherein the switching circuit further comprises:

an energy storage element coupled between the switching node and the ground node;

a switching element coupled between the input voltage and the energy storage element to selectively provide the input voltage to the switching node based upon the modulated control signal; and wherein the switching node is positioned between the switching element of the switching circuit and the input voltage cancellation circuit.

5. The power converter of claim 1, wherein the bias on the second capacitor of the input voltage cancellation circuit is substantially constant during the discharge cycle of the switching circuit.

6. The power converter of claim 4, wherein the modulated control signal is provided to the switching element by a pulse width modulated (PWM) controller.

7. The power converter of claim 1, wherein the switching circuit further comprises:

an energy storage element coupled between the input voltage cancellation circuit and the ground node;

a switching element coupled between the input voltage and the energy storage element to selectively provide the input voltage to the input voltage cancellation circuit based upon the modulated control signal; and wherein the switching node is positioned between the input voltage cancellation circuit and the first diode of the switching circuit.

8. The power converter of claim 1, wherein the low supply voltage and the high supply voltage are negative supply voltages provided to one or more subscriber line interface circuits (SLICs).

9. The power converter of claim 1, wherein the input voltage is a positive voltage, the low supply voltage is a negative voltage and the high supply voltage is a negative voltage.

10. A system comprising:

a plurality of subscriber line interface circuits (SLICs), each SLIC operable to communicate with a plurality of subscriber lines;

at least one subscriber line audio processing circuit (SLAC) coupled to each of the plurality of SLICs, the at least one SLAC operable to generate a reference voltage based upon an operating condition received from one or more of the plurality of SLICs;

a pulse width modulated (PWM) controller operable to receive the reference voltage from the SLAC and to generate a modulated control signal based upon the reference voltage;

a power converter operable to receive the modulated control signal and an input voltage and to generate a low supply voltage and a high supply voltage, wherein the voltage converter comprises;

a switching circuit to selectively provide an input voltage to a switching node at a switching frequency to establish a charging cycle and a discharging cycle based upon a modulated control signal to generate a low supply voltage having a low supply voltage magnitude at a first output node of a power converter, wherein the switching circuit comprises a first capacitor coupled between the first output node of the power converter and a ground node;

an input voltage cancellation circuit coupled to the switching node, wherein the switching circuit further comprises a first diode coupled between the input voltage cancellation circuit and the first output node of the power converter, wherein the input voltage cancellation circuit comprises a second capacitor coupled between the switching node and the first diode and a second diode coupled between the second capacitor and the ground node and wherein the switching frequency of the switching circuit is such that a bias on the second capacitor does not have adequate time to discharge during the discharging cycle of the switching circuit so as to maintain an offset across the second capacitor equal to the input voltage thereby cancelling input voltage selectively provided to the switching node by the switching circuit such that the switching node swings by an amount which is independent of an amplitude of the input voltage; and a boost circuit coupled to the switching node and to the switching circuit, the boost circuit operable to generate the high supply voltage having a high supply voltage magnitude at a second output node of the power converter, wherein the high supply voltage magnitude is a multiple of the low supply voltage magnitude.

11. The system of claim 10, wherein the high supply voltage magnitude is independent of a magnitude of the input voltage.

12. The system of claim 10, wherein a voltage swing of the switching node is substantially equal to the low supply voltage magnitude.

13. The system of claim 10, wherein the switching circuit comprises:

an energy storage element coupled between the switching node and the ground node;

a switching element coupled between the input voltage and the energy storage element to selectively provide the input voltage to the switching node based upon the modulated control signal; and wherein the switching node is positioned between the switching element of the switching circuit and the input voltage cancellation circuit.

14. The system of claim 10, wherein the bias on the second capacitor of the input voltage cancellation circuit is substantially constant during the discharge cycle of the switching circuit.

15. A method comprising:
generating, by a switching circuit, a low supply voltage having a low supply voltage magnitude at a first output node of a power converter by selectively providing an input voltage to a switching node at a switching frequency to establish a charging cycle and a discharging cycle based upon a modulated control signal;
charging a capacitor of an input voltage cancellation circuit during the charging cycle to establish a bias on the capacitor of the input voltage cancellation circuit equal to the input voltage and maintaining the bias on the capacitor input voltage cancellation circuit during the discharging cycle to cancel, by the input voltage cancellation circuit, the input voltage selectively provided to the switching node by the switching circuit such that the switching node swings by an amount which is independent of an amplitude of the input voltage; and
generating, by a boost circuit, a high supply voltage having a high supply voltage magnitude at a second output node of the power converter, wherein the high supply voltage magnitude is a multiple of the low supply voltage magnitude.

16. The method of claim 15, wherein the high supply voltage magnitude is independent of a magnitude of the input voltage.

17. The method of claim 15, wherein generating, by the switching circuit, the low supply voltage at the first output node of the power converter comprises:
activating and deactivating a switching element of the switching circuit based upon the modulated control signal to establish a duty cycle in the switching circuit, the duty cycle comprising the charging cycle and the discharging cycle;
charging an energy storage element of the switching circuit during the charging cycle of the switching circuit; and
discharging the energy storage element through a first diode and through a capacitor of the switching circuit during the discharging cycle, to generate the low supply voltage at the first output node of the power converter.

18. The method of claim 17, wherein generating the high voltage supply voltage at the second output node comprises:
establishing a voltage across a pump capacitor of each of a plurality of boost stages of the boost circuit during the charging cycle, wherein the voltage across the pump capacitor is substantially equal to the low supply voltage magnitude plus the magnitude of the input voltage; and
generating the high supply voltage that is a multiple of the low supply voltage and is independent of the magnitude of the input voltage.

19. The method of claim 15, further comprising:
providing, from one or more of a plurality of subscriber line interface circuits (SLICs), an operating condition to at least one subscriber line audio processing circuit (SLAC);
generating, at the at least one SLAC, a reference voltage based upon the operating condition received from one or more of the plurality of SLICs; and
receiving the reference voltage at a pulse width modulated (PWM) controller; and
generating the modulated control signal at the PWM controller based upon the reference voltage.

20. The method of claim 15, further comprising, providing the low supply voltage and the high supply voltage to one or more subscriber line interface circuits (SLICs).

* * * * *

UNITED STATES PATENT AND TRADEMARK OFFICE
CERTIFICATE OF CORRECTION

PATENT NO. : 11,881,775 B2
APPLICATION NO. : 17/244882
DATED : January 23, 2024
INVENTOR(S) : Jason Rabb It is certified that error appears in the above-identified patent and that said Letters Patent is hereby corrected as shown below:

In the Claims

Column 16, Line 43, Claim 10, replace "cancelling input" with --cancelling out the input--.

Signed and Sealed this
Fifth Day of March, 2024

Katherine Kelly Vidal
*Director of the United States Patent and Trademark Office*